June 3, 1941. J. E. SMITH 2,244,580
ELECTRICAL HEATING VESSEL
Filed Dec. 31, 1937
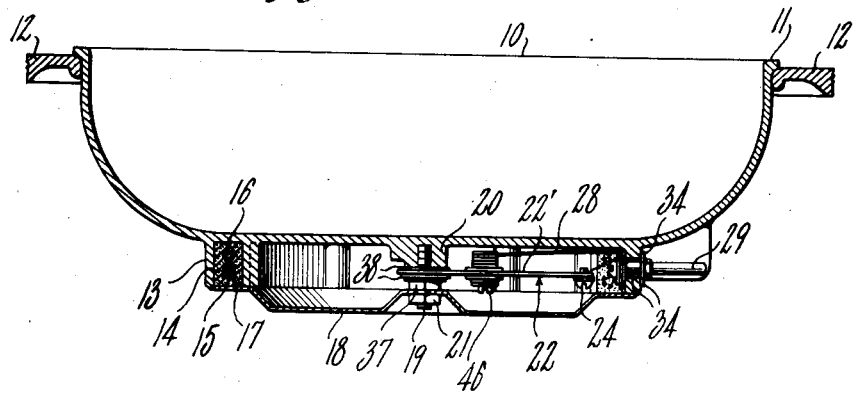
Fig. 2.
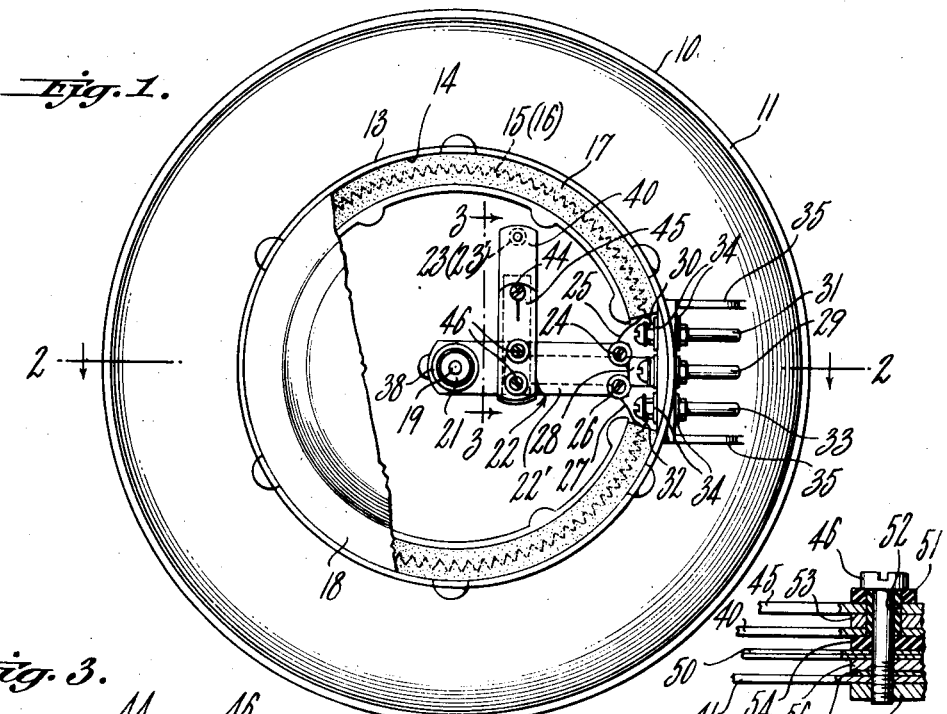
Fig. 1.
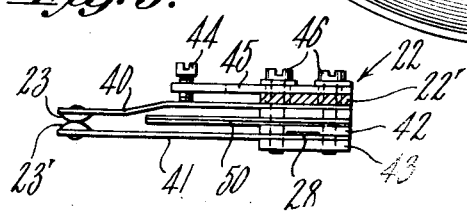
Fig. 3.
Fig. 4.
INVENTOR.
JOHN ERNEST SMITH
BY
ATTORNEY.

Patented June 3, 1941

2,244,580

UNITED STATES PATENT OFFICE 2,244,580

ELECTRICAL HEATING VESSEL

John E. Smith, Plainfield, N. J.

Application December 31, 1937, Serial No. 182,714

2 Claims. (Cl. 219—44)

This invention relates in general to cooking vessels, and more particularly to a vessel of this character having electrical heating means associated therewith for heating the contents thereof.

One of the features of the invention is the provision of a pair of heating elements in the bottom of the vessel, adapted for different heating effects, such as a high heat for cooking the contents of the vessel, and a low heat for keeping the contents warm.

Another feature is the provision of a thermostat which is effective to cut off the service current from the heating element when the temperature of the vessel has reached a predetermined limit.

A further feature is the provision of a pair of heating elements in a heating vessel in combination with means whereby either one of the two heating elements may be readily connected to or disconnected from the source of current, the whole assembly forming a self-contained unit with the thermostat and requiring no outside wiring except the necessary connections to the source of current, which connections are preferably made by suitable pins selectively connectible to a service plug.

Various other features of advantage and improvement will become apparent as the description proceeds, reference being made to the accompanying drawing forming a part of this specification, and in which:

Fig. 1 is bottom plan view of a bowl type of vessel with portions broken away, and illustrating one practical application of the invention to a vessel of this kind, Fig. 2, a transverse sectional view on the line 2—2 of Fig. 1, and showing a support for the vessel, Fig. 3, a cross-section on the line 3—3 of Fig. 1, showing a suitable form of thermostat for use with the heating elements, and Fig. 4, a fragmentary sectional view illustrating another suitable form of construction for the thermostat assembly.

In the drawing the reference numeral 10 indicates a bowl type of heating vessel which may have a circumferential flange 11 for seating on a suitable supporting means 12 holding the vessel in position for use.

The vessel 10 is provided at its bottom with a ring-like extension 13 having a circular channel 14 containing a lower heating element 15 and an upper heating element 16 embedded in heat-resisting insulating maerial 17 filling the channel 14 and completely surrounding the heating elements. A cover plate 18 spans the bottom of the extension 13 to enclose the embedded heating elements 15 and 16, the plate being secured by a threaded stud 19 and a nut 21 to a lug 20 located in the bottom of the bowl 10.

A thermostatic switch 22 is positioned within the space encompassed by the ring-like extension 13 between the bottom of the bowl 10 and the plate 18. Contact points 23 and 23' are adapted to be opened and closed in accordance with predetermined temperature variations to cut off the current to either of the heating elements 15 and 16 in use as will be more fully described later with reference to the details of the switch 22.

One end 25 of the heating element 15 is connected to a terminal screw 24 of a rigid metal strip 22' forming a part of the switch 22. The other end 32 of the heating element 15 is secured to a plug-connection or terminal pin 33. Similarly one end 27 of the heating element 16 is connected to the terminal screw 26 of the strip 22', and the other end 30 is secured to a terminal pin 31. A third pin 29 is connected by a metal strap 28 to the contact point 23' of the thermostat, and each of the pins referred to is insulated from the body of the bowl by suitable insulating means such as indicated at 34.

Guard pieces 35 may be employed at the sides of the pins 31 and 33 for the usual purposes in electrical appliances of this kind.

The thermostatic switch 22 is rigidly mounted on the stud 19 through the medium of plate 22' which has a suitable aperture through which the stud is passed, the plate 22' being held in position by the nut 37, suitable insulation 38 being interposed to prevent electrical contact between the plate 22' and the metal of the lug 20 and the stud 19.

The contact point 23 is mounted on the end of a metal blade 40, whereas the contact point 23' is mounted on the free end of a lower blade 41 and electrically connected to the pin 29 by the strap 28. The blade 40 is in electrical connection with the ends 25 and 27 of the coils 15 and 16 respectively through the medium of the strip 22', the terminals 24 and 26 being in common electrical connection with the strip 22'. The strap 28 leads from the lower blade 41 directly to the intermediate pin 29, and is insulated from the other parts of the switch by insulating pieces 42 and 43. An adjusting screw 44 carried by a projecting piece 45 is utilized for obtaining proper setting of the contact points 23 and 23' as will be readily understood. The assemblage of parts is held together by screws 46. A bi-metallic strip 50 is adapted to flex downward toward the lower blade 41, and pushes that blade away from the upper blade 40 to break the contacts 23 and 23′ upon a predetermined temperature rise in the bowl.

The switch assembly also may be constructed as illustrated in Fig. 4, wherein the screw is insulated from the piece 45 by insulation 51 and a bushing 52. The blade 40 is interposed between a washer 53 and insulation 54. The bi-metal 50 faces the insulation 54. The strap 28 and the lower blade 41 are held by a plate 55 against a washer 56, and the whole assembly is fastened together as a unit by the screws 46 which thread into the plate 55.

As will be apparent from the foregoing construction, a service plug when connected to the two terminal pins 29 and 31 will supply current to the upper heating element 16 which may be a high heat or cooking element. Similarly if the plug is connected to the pins 29 and 33 the lower heating element 15 will be supplied with current, for instance for keeping the contents of the bowl at a reduced heat or merely warm, depending upon the characteristics of that particular element.

It will also be seen that the thermostat is located and arranged to be quickly responsive to temperature changes in the bowl, providing reliable means for cutting off the service current to protect the heating elements and the associated parts in the event of a dangerous rise in temperature, cutting off at heats above cooking temperatures.

It is to be understood that the invention is not confined to the details of construction herein enumerated, but is capable of various modifications, alterations, and application to other types of heating vessels. The invention is therefore not to be restricted except as defined by the scope of the appended claims.

I claim:

1. A cooking vessel comprising a bowl having side and bottom, a channel formed on the bottom of the bowl adjacent the juncture of the sides and bottom, and heating elements for high and low heats disposed in said channel at different vertical levels, a cover plate enclosing the heating elements in the channel and forming an enclosed chamber at the bottom of the vessel, and a thermostatic switch mounted in said chamber and connected to at least one of said elements, said switch including a pair of contacts normally spring closed and a separate bi-metallic strip, said contacts being adapted to be opened by flexure of the bi-metallic strip.

2. A cooking vessel comprising a bowl having curved sides and a bottom, a channel formed on the bottom of the bowl at the juncture of the sides and bottom, a pair of heating elements embedded in insulation material and housed in said channel, said heating elements being arranged for cooking and warming temperatures in said bowl, a plurality of terminals accessible from outside said channel for the attachment of a service plug, to which terminals the heating elements are connected, a thermostatic switch mounted on the bottom of the vessel and arranged to control the circuit of at least one of the heating elements to maintain a desired temperature in said bowl.

JOHN E. SMITH.